US011214230B2

(12) United States Patent
Klingseisen et al.

(10) Patent No.: US 11,214,230 B2
(45) Date of Patent: Jan. 4, 2022

(54) BELT GUIDE SYSTEM

(71) Applicant: Bayerische Motoren Werke Aktiengesellschaft, Munich (DE)

(72) Inventors: Florian Klingseisen, Oberhaching (DE); Andreas Loecherer, Buchloe (DE); Matthias Sagerer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 38 days.

(21) Appl. No.: 16/781,568

(22) Filed: Feb. 4, 2020

(65) Prior Publication Data

US 2020/0172047 A1 Jun. 4, 2020

Related U.S. Application Data

(63) Continuation of application No. PCT/EP2018/071180, filed on Aug. 3, 2018.

(30) Foreign Application Priority Data

Aug. 8, 2017 (DE) .................... 10 2017 213 808.4

(51) Int. Cl.
*B60R 22/46* (2006.01)
*B60R 22/18* (2006.01)
(52) U.S. Cl.
CPC ...... *B60R 22/46* (2013.01); *B60R 2022/1818* (2013.01)
(58) Field of Classification Search
CPC . B60R 2022/1818; B60R 22/18; B60R 22/46; B60R 2022/1825; B60R 2022/1831
See application file for complete search history.

(56) References Cited

U.S. PATENT DOCUMENTS 4,682,791 A 7/1987 Ernst
2005/0206198 A1 9/2005 Kajiwara et al.
(Continued)

FOREIGN PATENT DOCUMENTS

CN 106256615 A 12/2016
DE 3008371 A1 * 9/1981 ............. B60R 22/24
(Continued)

OTHER PUBLICATIONS

International Search Report (PCT/ISA/210) issued in PCT Application No. PCT/EP2018/071180 dated Sep. 28, 2018 with English translation (four (4) pages).
(Continued)

*Primary Examiner* — Jonathan Ng
*Assistant Examiner* — Mary E Young
(74) *Attorney, Agent, or Firm* — Crowell & Moring LLP

(57) ABSTRACT

A belt guide system of a vehicle guides a restraining belt between an automatic belt mechanism and a passenger area in which the restraining belt can be placed onto an occupant of the vehicle. The belt guide system includes a belt slide on which the restraining belt bears at least in part. The belt slide has a deflection region on which the restraining belt is guided to change the angle. A friction-reducing element, by which the friction of the restraining belt is reduced on the deflection region relative to the rest of the restraining belt, is provided on the deflection region.

14 Claims, 3 Drawing Sheets

(56) References Cited

U.S. PATENT DOCUMENTS

| | | | |
|---|---|---|---|
| 2007/0182236 A1* | 8/2007 | Fahim | B60R 22/26 297/473 |
| 2008/0252059 A1 | 10/2008 | Tabata et al. | |
| 2009/0146487 A1 | 6/2009 | Becker et al. | |
| 2012/0175936 A1* | 7/2012 | Miyagawa | B60R 22/18 297/479 |
| 2015/0367813 A1* | 12/2015 | Ballarin | B60R 22/18 280/805 |
| 2016/0207496 A1* | 7/2016 | Tanabe | B60R 22/03 |
| 2016/0368450 A1 | 12/2016 | Kuhley | |
| 2017/0129449 A1* | 5/2017 | Stegerer | B60R 22/03 |
| 2020/0331425 A1* | 10/2020 | Loecherer | B60R 22/24 |

FOREIGN PATENT DOCUMENTS

| | | | | |
|---|---|---|---|---|
| DE | 34 12 383 A1 | | 10/1985 | |
| DE | 39 00 510 A1 | | 7/1990 | |
| DE | 10124503 A1 | * | 11/2002 | B60R 22/00 |
| DE | 102 00 104 A1 | | 7/2003 | |
| DE | 10 2005 010 059 A1 | | 9/2005 | |
| DE | 10 2008 045 999 A1 | | 6/2009 | |
| DE | 102009057670 A1 | * | 6/2011 | B60R 21/18 |
| EP | 1 338 485 A2 | | 8/2003 | |
| EP | 1 338 486 A2 | | 8/2003 | |
| EP | 2724899 A1 | * | 4/2014 | B60R 22/24 |
| JP | 2008-260463 A | | 10/2008 | |
| KR | 10-2005-0020149 A | | 3/2005 | |
| WO | WO 2006/092206 A1 | | 9/2006 | |

OTHER PUBLICATIONS

German-language Written Opinion (PCT/ISA/237) issued in PCT Application No. PCT/EP2018/071180 dated Sep. 28, 2018 (seven (7) pages).

German-language Search Report issued in counterpart German Application No. 10 2017 213 808.4 dated May 14, 2018 with partial English translation (12 pages).

Chinese-language Office Action issued in Chinese Application No. 201880050917.9 dated Sep. 7, 2021 with English translation (10 pages).

* cited by examiner

BELT GUIDE SYSTEM

CROSS REFERENCE TO RELATED APPLICATIONS

This application is a continuation of PCT International Application No. PCT/EP2018/071180, filed Aug. 3, 2018, which claims priority under 35 U.S.C. § 119 from German Patent Application No. 10 2017 213 808.4, filed Aug. 8, 2017, the entire disclosures of which are herein expressly incorporated by reference.

BACKGROUND AND SUMMARY OF THE INVENTION

The present invention relates to a belt guiding system for guiding a restraining belt in a vehicle. The invention also relates to a vehicle comprising a belt guiding system of this kind.

Restraining belts which serve to restrain an occupant of a vehicle in the event of a crash are known from the prior art. The restraining belt thus increases the safety of the occupants of the vehicle.

FIG. 1 shows, schematically, a belt guiding system 1 of a vehicle according to the prior art. The belt guiding system 1 comprises a restraining belt 2 which extends from an automatic belt mechanism 3 to a passenger area 4. The passenger area 4 corresponds to a region where the restraining belt 2 is applied to an occupant of the vehicle and in particular is latched to a support element by means of a latching device.

The automatic belt mechanism 3 serves to tighten the restraining belt 2. This ensures that, specifically in crash situations, the restraining belt 2 is applied closely to the occupant. Tightening generally takes place within a very short time, for example within 10 ms. After tightening of the restraining belt 2, a limiting of a belt force takes place in order to thereby not exceed a biomechanically maximum force that can be transferred to the occupant.

A belt slide 5 is present for the purpose of guiding the restraining belt 2 from the automatic belt mechanism 3 to the passenger area 4. This is an element made of synthetic material, on which the restraining belt 2 is guided. The belt slide 5 is secured to a support element of the vehicle, for example by means of bearings 14.

At a deflection region 11, the restraining belt 2 is guided so as to experience a change in angle. In particular, the restraining belt 2 is guided through an arc of 90°. If the restraining belt 2 is tightened, there is a risk of localized welding between the restraining belt 2 and the belt slide 5 at the deflection region 11 owing to a rapid relative movement. Localized welding of this kind prevents the automatic belt mechanism 3 from effectively limiting the force acting on the occupant, which is actually intended to take place after tightening.

The invention has the object of providing a belt guiding system which, while being simple and cost-effective to produce and install, permits safe and reliable restraint of an occupant of a vehicle.

The object is achieved with a belt guiding system of a vehicle comprising a friction-reducing element. The belt guiding system is designed to guide a restraining belt between an automatic belt mechanism and a passenger area. At the passenger area, the restraining belt can be applied to an occupant of the vehicle, whereby the occupant can be restrained. In particular, the belt guiding system can be secured to a pillar of the vehicle, the restraining belt being guided from the automatic belt mechanism to the passenger area. The belt guiding system has a belt slide on which at least part of the restraining belt bears. As a result, there is relative movement between the restraining belt and the belt slide so that the restraining belt slides on the belt slide. The resulting friction has no negative effects on the operation of the belt guiding system. The belt slide has a deflection region at which the restraining belt is guided so as to experience a change in angle. Thus, the restraining belt rests on the belt slide with a wrap angle of in particular at least 60° or at least 90°. The deflection region causes an increase in the friction between the restraining belt and the belt slide. For that reason, the deflection region has the friction-reducing element by which friction between the restraining belt and the deflection region is reduced compared to the rest of the belt slide. This prevents the restraining belt from welding to the belt slide in the deflection region. This prevention of welding makes it possible to reliably limit the belt force of the restraining belt after tightening.

The friction-reducing element comprises an insert element which is inserted into a recess of the belt slide at the deflection region. The insert element has a lower friction coefficient than the rest of the belt slide. Also, the insert element has a higher melting point than the belt slide in order to thus minimize welding of the belt strap of the restraining belt to the belt slide and the insert element. In particular, the restraining belt wraps around the insert element with the previously described wrap angle and therefore no longer bears directly against the belt slide in the deflection region.

Alternatively, the friction-reducing element has a deflection mechanism that is independent of the belt slide. In particular, the deflection mechanism supports the deflection of the restraining belt through the belt slide. Thus, in the deflection region, the restraining belt does not bear on the belt slide but rather is guided by the deflection mechanism. The deflection mechanism is in particular a deflection plate and/or a deflection bracket. The deflection mechanism again reduces the friction of the restraining belt, thus reducing the risk of welding between the restraining belt and the belt slide.

Particularly preferably, the insert element or the deflection mechanism is made of a metallic material and/or a synthetic material. The metallic material and the synthetic material have, in particular, a lower friction coefficient and a higher melting point than the material of the belt slide. This reduces the risk of welding between the restraining belt and the insert element or the deflection mechanism due to rapid relative movement. This also reduces wear on the restraining belt and as a result the restraining belt has a long lifespan.

In a further alternative, the friction-reducing element has a rolling element. The rolling element is in particular a deflection roller. The rolling element serves to deflect the restraining belt, with the restraining belt rolling rather than sliding over the rolling element.

Finally, in one alternative, the friction-reducing element has cooling bores which are introduced into the belt slide in the deflection region. As an alternative to the cooling bores, there are cooling ribs which are added to the belt slide in the deflection region. The cooling bores on one hand reduce the contact surface between the belt slide and the restraining belt in the deflection region. On the other hand, the cooling bores or cooling ribs serve to reduce heating of the belt slide. This reduces the risk of welding between the belt slide and the restraining belt.

The belt slide is preferably made of synthetic material. This makes the belt slide simple and easy to produce. In particular, the belt slide is easy to manufacture because the risk of welding between the belt slide and the restraining belt is reduced by the friction-reducing element. This means that it is not necessary for the belt slide itself to have any measures for reducing said friction.

The automatic belt mechanism is advantageously designed to actively tension the restraining belt. This is brought about in particular by means of a pyrotechnic charge. Active tensioning produces a rapid movement of the restraining belt relative to the belt slide. Simultaneously, the friction-reducing element ensures that the risk of welding between the restraining belt and the belt slide, owing to the tightening and the rapid relative movement resulting therefrom is minimized.

The invention also relates to a vehicle comprising a belt guiding system as described above. Thus, the vehicle makes it possible to restrain the occupants in a safe and reliable manner. In particular, it is possible for a belt force limiting operation, after tightening of the restraining belt, to be carried out in a reliable manner.

The belt guiding system can in principle be applied to any seat of the vehicle. Particularly advantageously, the belt guiding system is applied to those seats which are located behind a driver seat, as considered in the direction of travel. Since the belt guiding system has considerable advantages in the case of children, the belt guiding system can be present in the vehicle at those seats on which children are allowed to sit or usually sit. This is the second row of seats, that is to say the seats behind the seat row of the driver seat. All of the other belt guiding systems, that is to say in particular the belt guiding systems of the first seat row, can be configured as in the prior art.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
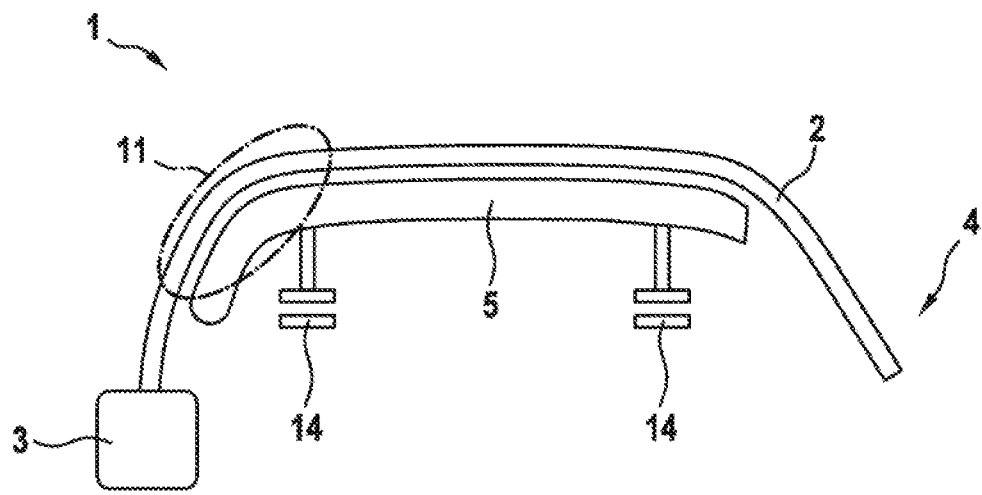
FIG. 1 is a schematic view of a belt guiding system according to the prior art.

FIG. 1 shows, schematically, a belt guiding system 1 according to the prior art. FIG. 1 has already been described in the background section.

Figure 2:
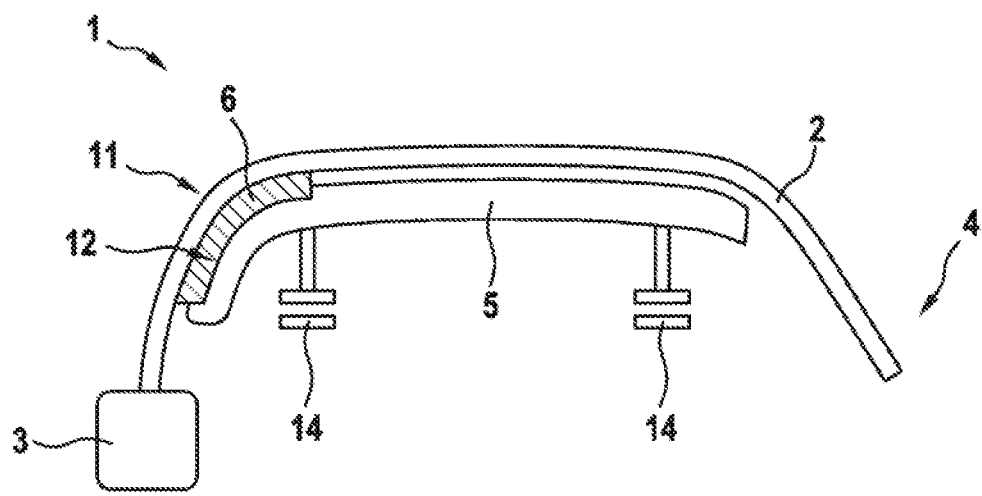
FIG. 2 is a schematic view of a belt guiding system according to a first exemplary embodiment of the invention.

FIG. 2 shows, schematically, a belt guiding system 1 according to a first exemplary embodiment for a vehicle. The belt guiding system 1 comprises a restraining belt 2 which runs from an automatic belt mechanism 3 to a passenger area 4. As already described, the passenger area 4 is a region where the restraining belt 2 can be applied to an occupant of a vehicle. A belt slide 5 serves to guide the restraining belt 2 from the automatic belt mechanism 3 to the passenger area 4. To that end, the belt slide 5 is secured to the vehicle by way of bearings 14. Preferably, the belt slide 5 is made of a synthetic material.

In the event of a crash, the restraining belt 2 must be applied tightly to an occupant who is to be restrained. At the same time, the restraining belt 2 must not transmit, to the occupant, arbitrarily large forces since the occupant's ability to withstand restraining forces is biomechanically limited. Therefore, the automatic belt mechanism 3 is designed to tighten the restraining belt 2 when required, which can be done within approximately 10 ms, in particular by way of a pyrotechnic charge. In that process, the restraining belt 2 is moved with a high relative velocity relative to the belt slide 5. After this, the automatic belt mechanism carries out a belt force limiting operation in order to protect the restrained occupants from excessively high forces.

The belt slide 5 has a deflection region 11 at which the restraining belt 2 is deflected by 90°. At this deflection region 11, the restraining belt 2 bears tightly against the belt slide 5. In order to prevent the restraining belt 2 from welding to the belt slide 5, in addition a friction-reducing element 6, 7, 8, 9 is added to the belt slide 5. In the first exemplary embodiment, shown in FIG. 2, this is an insert element 6 which is inserted into a recess 12 of the belt slide 5. In that context, the recess 12 is applied in the deflection region 11.

The insert element 6 is in particular made of metal. By virtue of the insert element 6, friction of the restraining belt 2 on the deflection region 11 is lower than at other points on the belt slide 5. This prevents possible welding between the restraining belt 2 and the belt slide 5. Thus, the belt slide does not have any negative influence on the belt force limiting function.

Figure 3:
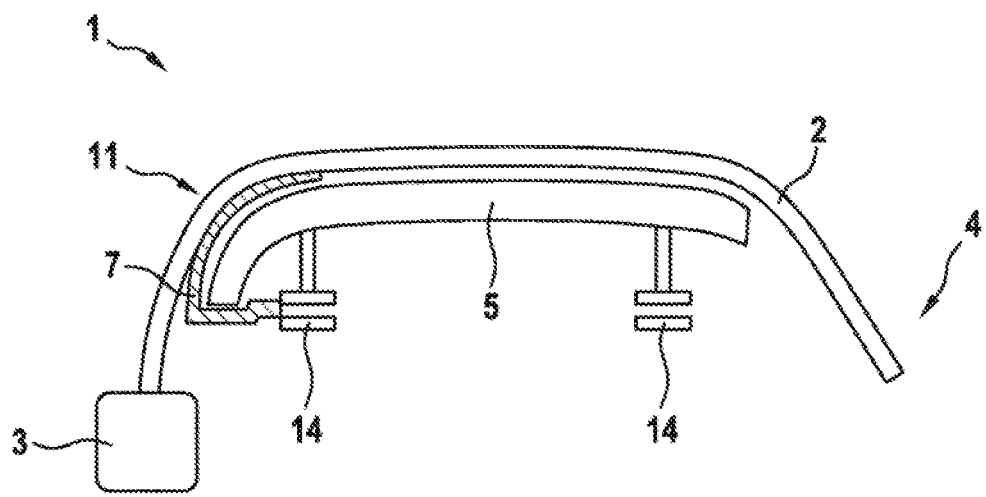
FIG. 3 is a schematic view of a belt guiding system according to a second exemplary embodiment of the invention.

FIG. 3 shows a second exemplary embodiment of the belt guiding system 1. The only difference with respect to the first exemplary embodiment lies in the friction-reducing element 6, 7, 8, 9 which, in the second exemplary embodiment, is a deflection mechanism 7. The deflection mechanism 7 can in particular be a deflection bracket or a deflection plate. In that context, it is provided that the deflection mechanism 7 is secured to one of the bearings 14 independently of the belt slide 5. Therefore, the restraining belt 2 runs through the deflection region 11 not on the belt slide 5 but on the deflection mechanism 7. Only after this does the restraining belt 2 bear on the belt slide 5. The deflection mechanism 7 is preferably made of metal, it being in particular provided that the restraining belt 2 slides on the deflection mechanism 7. This in turn avoids friction between the restraining belt 2 and the deflection region 11, meaning that there is no localized welding between the belt slide 5 and the restraining belt 2 in the deflection region 11.

Figure 4:
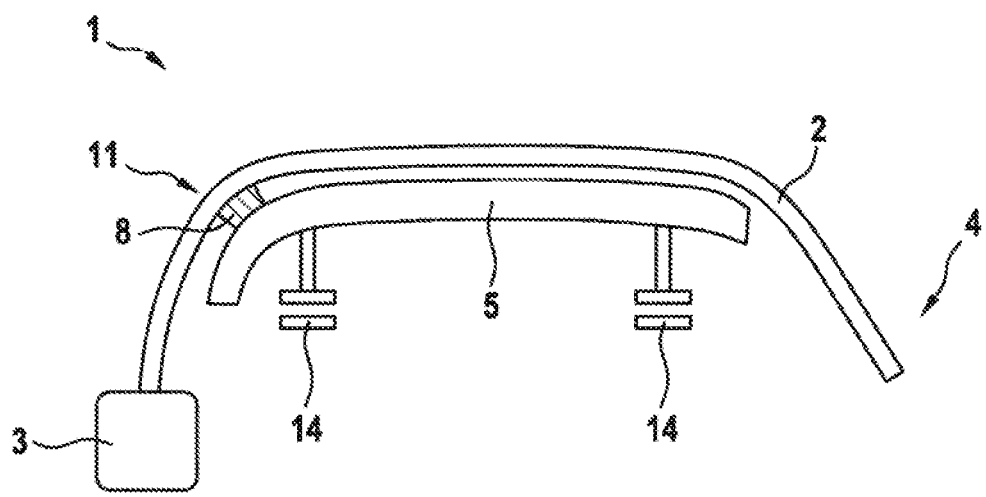
FIG. 4 is a schematic view of a belt guiding system according to a third exemplary embodiment of the invention.

FIG. 4 shows a third exemplary embodiment of the belt guiding system 1. The only difference with respect to the preceding exemplary embodiments lies once again in the friction-reducing element 6, 7, 8, 9 which, in the third exemplary embodiment, is a deflection roller 8. The deflection roller 8 is arranged in the deflection region 11 on the belt slide 5. Thus, the restraining belt 2 does not slide on the belt slide 5 through the deflection region 11, but rather is guided by the deflection roller 8 in a rolling manner. This leads to minimized friction between the restraining belt 2 and the deflection region 11. Once again, this avoids welding between the restraining belt 2 and the belt slide 5.

Figure 5:
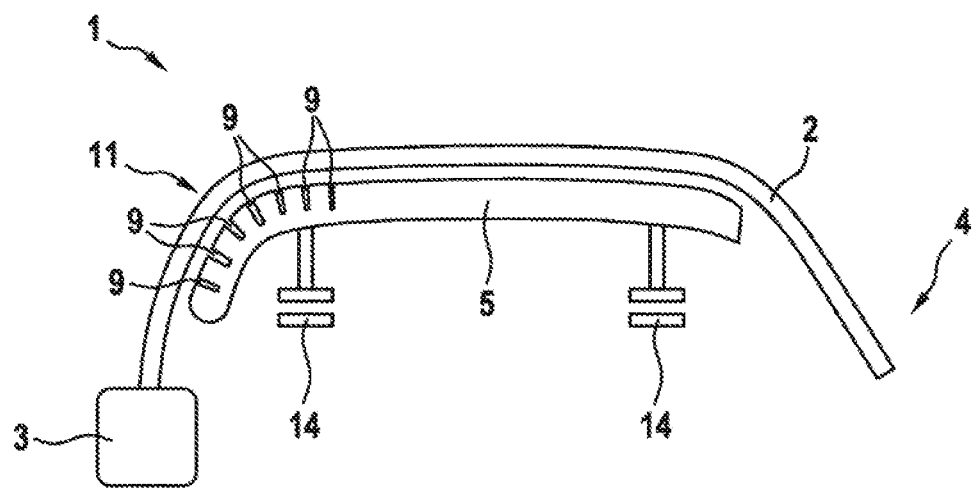
FIG. 5 is a schematic view of a belt guiding system according to a fourth exemplary embodiment of the invention.

FIG. 5 shows a fourth exemplary embodiment of the belt guiding system 1. The only difference with respect to the preceding exemplary embodiments lies once again in the friction-reducing element 6, 7, 8, 9 which, in the fourth exemplary embodiment, takes the form of cooling bores 9. The cooling bores 9 have the effect, on one hand, of minimizing a surface against which the restraining belt 2 bears in the deflection region 11. On the other hand, heat generated by friction between the restraining belt 2 and the deflection region 11 is dissipated, and thus the cooling bores 9 prevent welding between the restraining belt 2 and the belt slide 5.

As previously described, the various exemplary embodiments of the belt guiding system 1 always serve to minimize friction between the restraining belt 2 and the belt slide 5 in the deflection region 11. In the deflection region 11, the restraining belt 2 bears against the belt slide 5 over a wrap angle which is in particular approximately 90°. Thus, this region is subject to an increased risk of localized welding when the restraining belt 2 is tightened, owing to high friction. This risk is reduced by the friction-reducing element 6, 7, 8, 9. Since localized welding of this kind leads to defective operation during the belt force limiting operation, the belt guiding system 1 serves to protect the restrained passenger of the vehicle.

Figure 6:
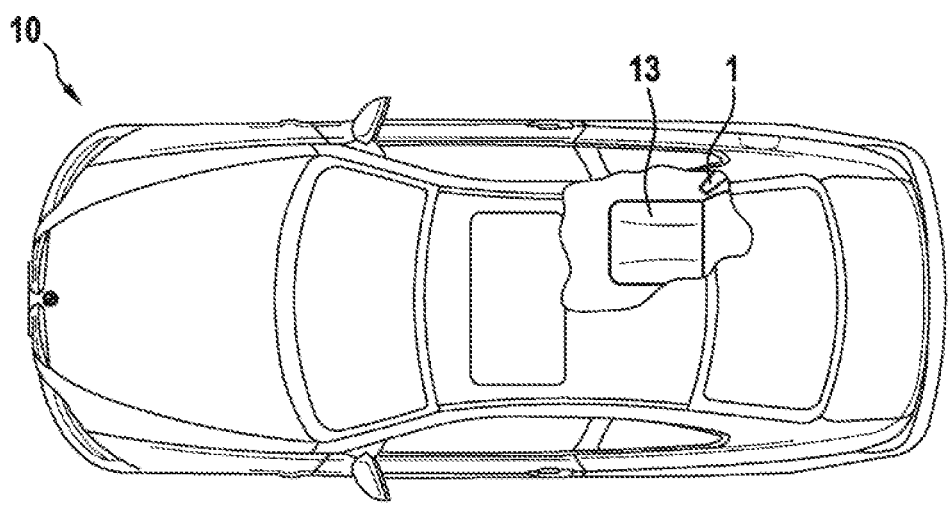
FIG. 6 is a schematic view of a vehicle according to an exemplary embodiment of the invention.

FIG. 6 shows, schematically, a vehicle 10 according to an exemplary embodiment of the invention. The vehicle 10 has at least one belt guiding system 1 according to one of the above-described exemplary embodiments. This belt guiding system 1 is preferably applied to a seat 13 of a seat row behind the driver seat. This corresponds to at least the second seat row of the vehicle 10.

The belt guiding system 1 is advantageous above all for children. Since children usually sit in the second seat row, or since there are legal requirements to this effect, it is sufficient to apply the above-described belt guiding system 1 to such seats which are positioned behind the driver seat of the vehicle, as considered in the direction of travel. Conventional belt guiding systems can be used at the remaining seat positions of the vehicle 10, which reduces the production costs of the vehicle 10. It is also possible for all of the belt guiding systems 1 of the vehicle 10 to be belt guiding systems 1 as described above.

LIST OF REFERENCE SIGNS

1 Bell guiding system
2 Restraining belt
3 Automatic belt mechanism
4 Passenger area
5 Belt slide
6 Friction-reducing element (insert element)
7 Friction-reducing element (deflection mechanism)
8 Friction-reducing element (rolling element)
9 Friction-reducing element (cooling bore)
10 Vehicle
11 Deflection region
12 Recess
13 Seat
14 Bearing The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A belt guiding system of a vehicle for guiding a restraining belt between an automatic belt mechanism and a passenger area, in which the restraining belt can be applied to an occupant of the vehicle, comprising:
   a belt slide on which the restraining belt rests at least in part,
   wherein the belt slide has a deflection region on which the restraining belt is guided so as to experience a change in angle, and
   wherein, at the deflection region, a friction-reducing element is provided by which friction between the restraining belt and the deflection region is reduced compared to a portion of the belt slide outside of the deflection region that also contacts the restraining belt.

2. The belt guiding system according to claim 1, wherein the friction-reducing element comprises an insert element which is inserted into a recess of the belt slide at the deflection region.

3. The belt guiding system according to claim 2, wherein the insert element is made of a metallic material and/or of a synthetic material.

4. The belt guiding system according to claim 1, wherein the friction-reducing element has a deflection mechanism, which is independent of the belt slide.

5. The belt guiding system according to claim 4, wherein the deflection mechanism is a deflection plate and/or a deflection bracket.

6. The belt guiding system according to claim 4, wherein the deflection mechanism is made of a metallic material and/or of a synthetic material.

7. The belt guiding system according to claim 1, wherein the friction-reducing element comprises a rolling element.

8. The belt guiding system according to claim 7, wherein the rolling element is a deflection roller.

9. The belt guiding system according to claim 1, wherein the friction-reducing element comprises cooling bores which are introduced into the belt slide at the deflection region.

10. The belt guiding system according to claim 1, wherein the friction-reducing element comprises cooling ribs added to the belt slide at the deflection region.

11. The belt guiding system according to claim 1, wherein the belt slide is made of synthetic material.

12. The belt guiding system according to claim 1, wherein the automatic belt mechanism is configured to actively tension the restraining belt.

13. A vehicle comprising a belt guiding system according to claim 1.

14. The vehicle according to claim 13, wherein the belt guiding system is installed at seats located, as viewed in a direction of travel, behind a driver seat of the vehicle.

* * * * *